(No Model.)
C. T. QUICK.
VEHICLE BRAKE.
No. 399,557. Patented Mar. 12, 1889.
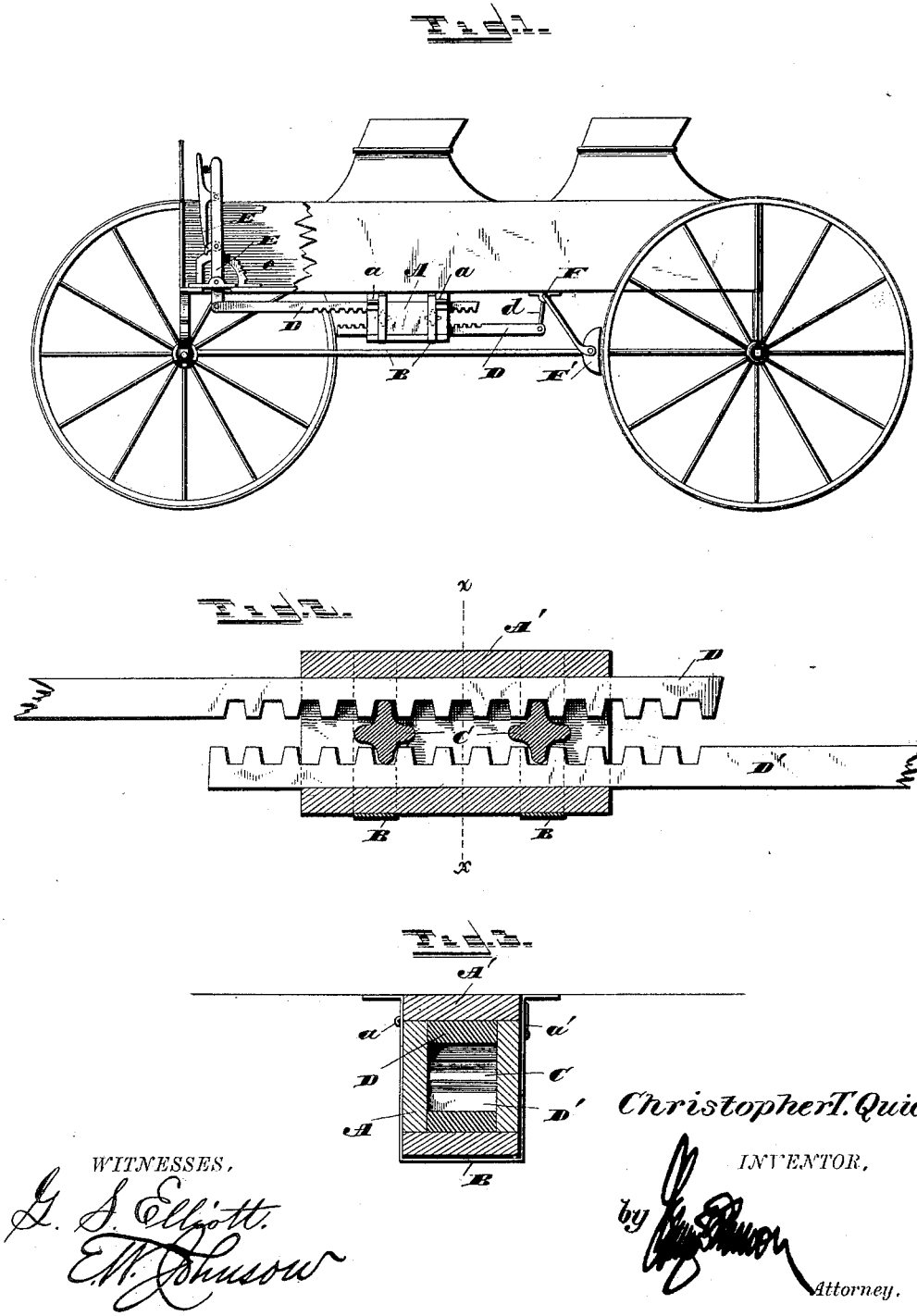

UNITED STATES PATENT OFFICE.

CHRISTOPHER T. QUICK, OF TEMPLE HILL, KENTUCKY.

VEHICLE-BRAKE.

SPECIFICATION forming part of Letters Patent No. 399,557, dated March 12, 1889.

Application filed December 27, 1888. Serial No. 294,812. (No model.)

*To all whom it may concern:*

Be it known that I, CHRISTOPHER T. QUICK, a citizen of the United States of America, residing at Temple Hill, in the county of Barrow and State of Kentucky, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in vehicle-brakes; and it consists in the novel construction and arrangement or combination of mechanical devices, as will be more fully hereinafter described and claimed.

The object of my invention is to provide a wagon-brake which is simple and effective in its construction and operation, strong and durable, and positive in its results. I attain this object by the construction illustrated in the accompanying drawings, wherein like letters of reference indicate similar parts in the several views, and in which—

Figure 1 is a side elevation of a vehicle, partially broken away, showing my improved brake applied in connection therewith. Fig. 2 is a longitudinal vertical section of the box-supporting part of the mechanism, showing the rack bars or levers and the pinions mounted in said box. Fig. 3 is a transverse vertical section on the line *x x* of Fig. 2.

A indicates the mechanism-supporting box, which is adapted to be secured to the under central part of the vehicle, and the major part thereof is secured to a strip, A', by hinges *a*. The opposite side of said box A is provided with suitable locking hasps and staples, *a'*. By such construction the box A can be thrown open and the internal mechanism exposed to view, and may be accessible for manipulation or readjustment. Said box is secured to the bottom of the vehicle by metallic straps B, surrounding the same.

Within the box A pinions C are journaled, said pinions being of any suitable form, as may be found desirable in constructing the device. These pinions C are engaged at their upper and lower parts by rack bars or levers D and D'.

The bar or lever D is secured to the lower end of the brake-actuating lever E, which in turn is provided with a spring-actuated pawl, E', situated in engaging proximity with the serrated sector-plate *e*. The lever E and the parts with which it operates are centrally situated in the body of the vehicle, against or close to the dash-board, and in the central part of the vehicle the bar or lever D' is secured at its outer end by a connecting-rod, *d*, to the brake-bar F, suitably journaled to the bottom side of the vehicle and carrying brake-shoes F', of ordinary form of construction, which are adapted to bear against the rear wheels of the vehicle.

By operating the lever E and drawing toward the rear of the vehicle the rack bar or lever D, connected thereto, is drawn forward, the gears C revolve, and the brake bar or lever D' projected rearward, thereby throwing the brake-shoes F' against the wheels.

My improved brake is especially applicable for use in ascending and descending steep grades or hills, and is effectual in taking the weight or impetus of the vehicle from the draft-animal.

My improved brake is readily applied in connection with vehicles already in the market without necessitating the employment of a varied construction of said vehicles.

It is obvious that many minor changes in the construction and arrangement of the parts could be made and substituted for those shown and described without departing from the nature or spirit of my invention.

Having thus described my invention, what I claim as new, and desire to secure by Letters Patent, is—

1. In a vehicle-brake, the combination of a supporting-box adapted to be secured to the under part of a vehicle, pinions or gears mounted therein, and the rack bars or lever engaging with the upper and lower parts of said pinions or gears and connected to an operating-lever, and the brake-bar carrying brake-shoes, substantially as described.

2. In a vehicle-brake, the combination of the box adapted to be opened and closed, secured to the bottom of the vehicle by metallic straps surrounding the same, pinions mounted in said box, and the rack-bars passing through said box and engaging with the upper and lower parts of said pinions, one of which is connected to an operating-lever in the forward part of the vehicle and the other to the brake-bar carrying the brake-shoes at the rear part of the vehicle, substantially as described.

In testimony whereof I affix my signature in presence of two witnesses.

CHRISTOPHER T. QUICK.

Witnesses:
    W. D. BUCKLEY.
    W. A. CARY.